June 23, 1970     OLE-BENDT RASMUSSEN     3,517,098
PROCESS OF FILM STRETCHING OVER GROOVED BAR
Original Filed July 6, 1964

INVENTOR.
OLE-BENDT RASMUSSEN
BY

ATTORNEYS

United States Patent Office 3,517,098
Patented June 23, 1970

3,517,098
PROCESS OF FILM STRETCHING OVER GROOVED BAR
Ole-Bendt Rasmussen, Copenhagen, Denmark, assignor to Phillips Petroleum Company, a corporation of Delaware
Original application July 6, 1964, Ser. No. 380,599. Divided and this application May 13, 1968, Ser. No. 728,607
Claims priority, application Denmark, Nov. 19, 1963, 5,412/63
Int. Cl. B29c *17/02;* B29d *7/24*
U.S. Cl. 264—288          8 Claims

ABSTRACT OF THE DISCLOSURE

Polyolefin film is pre-stretched over a grooved bar at about 20° C. to form a network of shearing lines. The stretching may be repeated. The pre-stretched film is subjected to regular stretching to about 400% of the original length to fully orient. Crystalline mono-1-olefins are preferred film materials.

---

Figure 3:

This application is a division of my copending U.S. application Ser. No. 380,599, filed July 6, 1964, now U.S. Pat. No. 3,400,041, which is a continuation-in-part of my U.S. application Ser. No. 215,743, filed Aug. 8, 1962, now U.S. Pat. No. 3,257,488.

This invention relates to a method and apparatus for cold-stretching films of orientable thermoplastic material, for example high density polyethylene or isotactic polypropylene. In another aspect the invention relates to a partially oriented film which can be stretched further in a very uniform manner. In another aspect it relates to an initial cold-stretching of a film of such material followed by a final stretching for the purpose of uniformly orienting the material.

The term "film" as used here should be understood as including films, bands, sheets, lay-flat tubing and like forms of material.

Cold-stretching, which means stretching at temperatures substantially below the melting range of the material to be stretched, is desirable in that it imparts greater toughness and tear resistance to the material than does a stretching near the melting range.

Considerable difficulties are met when films of high density polyethylene or ethylene copolymers or isotactic polypropylene are cold-stretched, said difficulties being due to the high crystallinity and consequently the great stiffness of the material. Owing to this, great force is necessary to tear the crystalline elements out of their original connections and to enable orientation to set in. On the other hand, once the original connections are broken, the flow of the chain molecules speeds up without much hindrance, and is, therefore, difficult to keep under control. When the process gets out of control, the general effect is that the orientation is concentrated in a very narrow zone or zones, and therefore the heat developed by the stretching cannot be led away quickly enough. The result is an instant and irregular temperature increase leading to rupture, probably because the material simply melts at some places. Cooling, as for example with a direct stream of water, is not sufficient, because the heat conductivity of the polymer is so low that only a small part of the stretching heat recahes the surfaces before rupture occurs.

Thus, if the film is cold-stretched without special precautions, orienting will set in at a stretching ratio of 1.25:1 or even less, but in an irregular manner, starting at randomly distributed places over the whole area of the film to which the stretching forces are applied. Once stretching has started at a locality in the film, it will continue for some time, in and around that neighborhood, owing to the above explained mechanism of the stretching process with the result that isolated irregularly shaped spots or areas of strongly oriented material are formed surrounded by material which has not been oriented at all. Since by stretching in one direction, the film will tend to contract in the transverse direction, it is easily understood that a rupture is likely to occur, if some of the oriented areas grow so big as to unite with neighboring areas, since the contraction forces will generally be at opposite directions at the place of contact between two such areas joining one another.

It has been found that with narrow strips of the film, stretching and contracting of such strips take place in a narrow zone across the width of the strip, the necking-down zone. If the width is sufficiently small, for example about 10 mm., ruptures can practically be avoided during the stretching. By cold-stretching at low velocities, e.g. in the ratio of 1.25:1, it was found that a network of shearing lines were formed in the material, i.e., oriented areas in a regular criss-cross pattern of short lines forming an angle of about 45–60° to the stretching direction, the orientation of the material, however, following the direction of stretching. By further slow stretching, preferably applying cooling with water, each of the shearing lines would gradually grow, till the film strip finally became totally oriented.

The shearing lines were interpreted as microscopic necking-down zones formed parallel to the direction of the maximum shear tension. The latter forms an angle of 45° to the direction of drawing, provided that the drawing forces are uniaxially directed.

In the cold-stretching of broader films, it was found that a substantially uniform stretching over the whole width could be obtained, according to the present invention, by subjecting the film to an initial stretching in evenly spaced longitudinal zones, said initial stretching being produced by advancing the film under tension over a series of projections, as between the grooves in a grooved bar or between the flutes in a cross-fluted roller, the tension on the film being adjusted so as to be of sufficient strength to start stretching the film at the crown portions between the grooves or flutes, but not in the intervening parts. It was found that in this manner the initial orienting process could be controlled so as to form a substantially regular pattern of shearing lines or microscopic necking-down zones across the whole width of the film.

Figure 4:
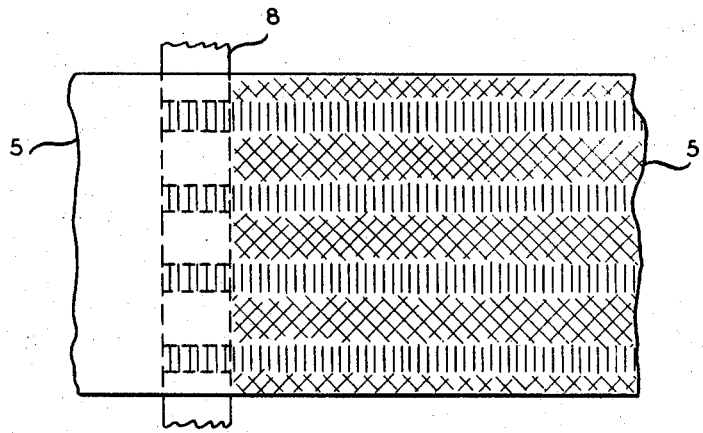
Figure 2:
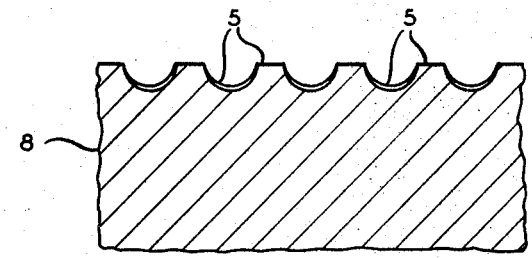
Figure 1:
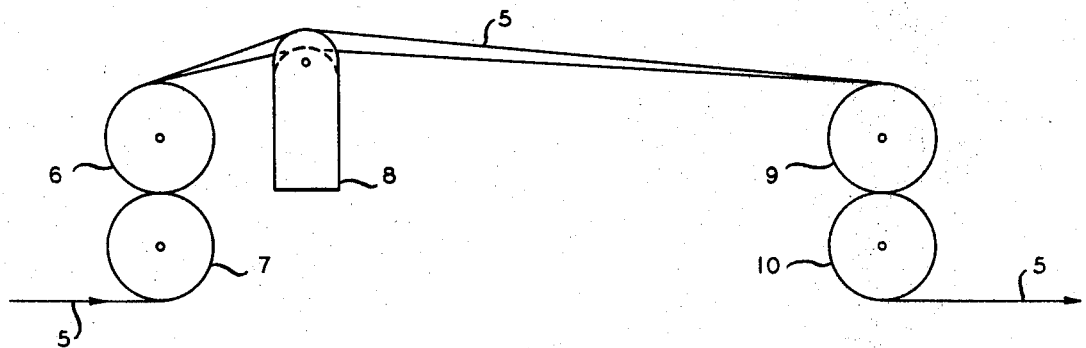

It is an object of this invention to provide an improved method of cold-stretching orientable thermoplastic films. Another object is to provide apparatus which can be used to produce uniform longitudinal orientation of wide sheets of plastic material. Another object is to provide films of crystalline polymers which can be cold stretched evenly without rupturing. Other objects, advantages, and features of this invention will be apparent to those skilled in the art from the following discussion and drawings in which:

FIG. 1 is a schematic drawing of the cold-stretching process;
FIG. 2 is a sectional view of a grooved bar;
FIG. 3 is a detail of another type of grooved bar; and
FIG. 4 is a plan view of a plastic sheet which has been partially oriented by drawing over the grooved bar.

The present invention can be used to orient films of any thermoplastic polymeric material which is capable of being oriented by stretching at temperatures below the melting point of the polymer. Most frequently such materials are highly crystalline polymers such as high density polymers of ethylene including polyethylene and copolymers of ethylene, with higher mono-1-olefins such as propylene or1-butene, and crystalline or isotactic polypropylene and similar copolymers of propylene with ethylene or 1-butene. These represent a well-known class of highly crystalline polymers of mono-1-olefins having 2 to 4 carbon atoms per molecule. Examples of the suitable polymers are polyvinylidene chloride, polyamides, polyethylene terephthalate, and the like. I prefer to work with the polymers of mono-1-olefins which have a crystallinity of at least 80 percent as determined by nuclear magnetic resonance on a specimen of polymer which is in thermal equilibrium. This can be achieved by heating the specimen to its melting point and then cooling it slowly to room temperature at a rate not exceeding 10 Fahrenheit degrees per minute.

As indicated above, once the original connections between the molecules of the material has been loosened, flow in the material becomes much easier, thus facilitating the subsequent stretching procedure for producing strong orienting. Owing to the uniform pattern of shearing lines across the whole width of the film, each shearing line forms a starting place for the flow of material in the further stretching, and the evolution of heat during the stretching is evenly distributed over the whole area which is under the influence of the stretching forces, and probably to some extent reduced, with the result that the stretching proceeds smoothly without ruptures .

In the above-mentioned copending application, Ser. No. 215,743, now Pat. No. 3,257,488, reference has been made to the use of a cross-fluted roller for producing a slipping line pattern, consisting of short slipping lines at an angle of 45° to the stretching direction in a process of orienting a film of an orientable polymer material.

In said copending application it is pointed out that the deficiencies of known orientation processes can be remedied by not leaving it to chance where the stretching process is initiated but by applying the stretching force in such a manner as to make the orientation progress in an orderly fashion. This is effected by displacing locally applied pressures, which are sufficient for producing a permanent stretching of the part of the sheet acted upon, crosswise over the breadth of the sheet in a narrow lateral zone as the sheet is being moved forward, and causing the said locally applied pressures to follow closely upon one another. The sheet can then be stretched further in a known manner.

In this way it is possible to insure that the stretching takes place over the entire breadth of the sheet in a lateral zone irrespective of possible variations in thickness and other irregularities in the sheet. By causing these lateral zones to follow closely upon one another in succession or in a continuous manner, the orientation is obtained over the entire length of the sheet. The method, therefore, has special advantages when applied to sheets which vary in thickness and in which this varying thickness tends to become accentuated by the stretching process. Such sheets are frequently formed by the known blown-tubing process in which film is formed by inflation of an extruded tube, such products being more or less laterally oriented by the molding process. The orientation process of this invention can also be applied quite well to thick sheets which are difficult to cold stretch.

As explained in the above-mentioned copending application, now patented, it is advantageous to use a cross-fluted roller in the stretching apparatus. This fluted roller serves to produce suitable points of departure for the orientation. At the passage of the sheet over the fluted roller a slight pleating is produced and at the same time the flutes cause a slight stretching to take place as manifested by the formation in the film of a slipping line pattern made up of short slipping lines at an angle of about 45 degrees to the longitudinal direction of the sheet which is also the direction of travel. The individual slipping lines thus formed provide the points for initiation of further orientation when the film is stretched longitudinally and the slipping line pattern ultimately disappears. It has been found that a sheet stretched in this manner is particularly suitable for fiber production since it yields extremely fine and uniform fibers. Now the cross-fluted roller has been improved upon by the use of the grooved bar as described herein, making use of the same principle of initiating a pattern of slipping lines in a regular manner at closely spaced intervals across the breadth of a sheet. The grooved bar has been found more suitable for this purpose, one of the points of difference from the fluted roller being the flat crown portions of the ridges which separate the grooves.

The stretching ratio to be used in the initial stretching can be varied only to a limited degree, and is preferably kept within the range from 1.1:1 to 1.4:1. Below the prior value, i.e. 10% increase of the length, the initial stretching is generally too feeble to form the shearing lines, which should be starting points in the subsequent stretching to obtain strong orienting, and at the upper limit for the drawing ratio, the microscopic necking-down tends to become inhomogenous. The best results are obtained by using a stretching ratio in the initial stretching step of about 1.25:1, the pattern of shearing lines being exceedingly fine and of uniform distribution when using this ratio.

Even if great care is taken in producing the raw material for extrusion of the films of high density polyethylene or isotactic propylene used in the present method, slight variations will inevitably occur from lot to lot of said material.

Thus it was observed that some lots gave a coarse pattern of shearing lines, and others a very fine one, and further it was noted that the latter were best suited for the cold-stretching procedure.

Based upon the above described work, it was concluded that the starting points for the formation of shearing lines are inhomogenous places in the material, such as, for example, accumulations of small molecules, bearing in mnd that the molecule size varies, or the presence of foreign substances in the otherwise homogenous material. By deliberately introducing a foreign substance into the main plastic before extrusion of the material, and it was found possible to regulate the fineness of the shearing line pattern.

According to an embodiment of the present method, therefore, a foreign material is incorporated into the film material. Particularly good results have been obtained by admixing polyisobutylene or polyvinylisobutyl ether, preferably in amounts of 5–15% by weight of the film material.

Referring now to the drawing which is described in connection with a specific embodiment, in FIG. 1, a film 5 of the material to be stretched, for example a 1 meter wide film of high density polyethylene of specific weight 0.96, and melting index 0.2, into which has been admixed 10 weight percent of polyisobutylene, passes over rollers 6 and 7 and a grooved bar 8 mounted close to said rollers 6 and 7 and then on to a pair of rollers 9 and 10.

The two pairs of rollers are driven at different peripheral speed so as to stretch the film at a stretching ratio of 1.25:1, the film velocity being 0.5 m./sec., and the stretching temperature being 20° C.

The grooved bar 8 has preferably a width or diameter of not more than about 12 mm., the surface which contacts the film being semicircular.

As it appears from FIG. 2, the grooves are rounded, in this instance of semicircular cross section, and are spaced apart, the intervening projections having substantially flat tops. The width of the projections is preferably about one-third to one-half the width of the grooves.

FIG. 3 illustrates an alternate design for the grooved bar which can be turned from a rod. Although cylindrical, this bar is mounted so that it does not rotate. Preferably there are about 1 to 2 grooves per centimeter of bar length and the radius of the bar is about 6 mm.

The film 5 contacts the curved upper surface of the grooved bar over an angle of about 90° and is, owing to the tension, also in fairly close contact with the bottom of the grooves over a slightly lesser angle. As shown in FIG. 1, the portions of the film at the top of the projections are under greater tension than the portions in the grooves.

As illustrated in FIG. 4, the stretching starts at the top of the projections, a fine pattern of shearing lines, which are parallel to the axis of the grooved bar, being formed. On leaving the grooved bar, the film flattens out, and owing to the shift of tensioning forces, a rougher criss-cross of shearing lines at angles of 45° to the lines of the formerly mentioned fine pattern, is formed.

To fully develop the shearing line pattern, the film is passed twice more through the stretching apparatus, and thus stretched to about double its length. Each stretching procedure reduces the width of the film by about 10%, and the thickness by about 15%.

By a subsequent stretching at room temperature, applying direct water cooling, and stretching to about 400% of the original length, the shearing line pattern disappears. The film has thus been equally stretched through and through, the resulting product being a strongly longitudinally oriented film of great tear resistance in all other directions than that of the orientation. This product is valuable in the making of laminates in which the directions of orientation of the plies lie at angles to each other, or in the manufacture of split fibers by fibrillating highly oriented film.

As will be apparent to those skilled in the art, various modifications can be made in this invention without departing from the spirit or scope thereof.

I claim:
1. A method of cold-stretching plastic films, comprising:
    forcibly contacting a stationary bar having flat crown portions separating substantially parallel rounded grooves with a longitudinal film of polyolefins, said film running longitudinally substantially parallel to the parallel grooves of said bar, and
    applying a longitudinal force to the film, while maintaining the film at about 20° C, to move said film relative to and in forcible contact with the flat crown portions of said bar for permanently stretching a plurality of substantially parallel, longitudinally extending portions of said film in contact with the bar and for thereafter longitudinally stretching portions of the film spaced from the bar, said longitudinal force causing the film to stretch to a ratio between the range of 1.1:1 to 1.4:1 based on the ratio of final to initial length of said film.
2. A method, as set forth in claim 1, wherein the film is a crystalline polymer of mono-olefins having 2-4 carbon atoms per molecule and a crystallinity of at least 80% as determined by nuclear magnetic resonance on a specimen of said polymer which is in thermal equilibrium.
3. A method, as set forth in claim 1, wherein the ratio to which the material is stretched is 1.25:1.
4. The method of claim 1 wherein said plastic material contains from about 5 to about 15 weight percent of a foreign polymer selected from the group consisting of polyisobutylene and polyvinylisobutyl ether.
5. A method, as set forth in claim 1, wherein the material is again placed in forcible contact with the stationary grooved member and stretched.
6. A method, as set forth in claim 5, wherein the film is thereafter stretched at about room temperature while being cooled directly with water and while spaced from the bar to about 400% of the original length.
7. A method, as set forth in claim 1, wherein the parallel stretched portions of the film caused by the flat crown portions of the bar have a width in the range of ⅓ to ½ the width of the parallel portions of the film between said parallel stretched portions.
8. A method, as set forth in claim 1, wherein the film is in forcible contact with the bar at an angle of about 90° relative to said bar.

References Cited
UNITED STATES PATENTS

| | | | |
|---|---|---|---|
| 3,048,895 | 8/1962 | Bottomley | 264—210 |
| 3,257,488 | 6/1966 | Rasmussen | 264—288 |
| 3,372,221 | 3/1968 | Lefevre et al. | 264—288 |
| 3,416,772 | 12/1968 | Sheehan. | |

FOREIGN PATENTS

| | | |
|---|---|---|
| 662,453 | 5/1963 | Canada. |

JULIUS FROME, Primary Examiner

HERBERT MINTZ, Assistant Examiner

U.S. Cl. X.R.

264—284, 292, 293

UNITED STATES PATENT OFFICE
CERTIFICATE OF CORRECTION

Patent No. 3,517,098 June 23, 1970

Ole-Bendt Rasmussen

It is certified that error appears in the above identified patent and that said Letters Patent are hereby corrected as shown below:

Column 6, line 7, "mono-olefins" should read -- mono-1-olefins --.

Signed and sealed this 6th day of October 1970.

(SEAL)
Attest:

Edward M. Fletcher, Jr.
Attesting Officer

WILLIAM E. SCHUYLER, JR.
Commissioner of Patents